Jan. 18, 1966    V. H. YOST    3,229,883
WELDING SKATE AND TRACK
Filed April 17, 1964    6 Sheets-Sheet 1

FIG. 1

INVENTORS
VAUGHN H. YOST

BY
ATTORNEYS

Jan. 18, 1966 V. H. YOST 3,229,883
WELDING SKATE AND TRACK
Filed April 17, 1964 6 Sheets-Sheet 2

INVENTORS,
VAUGHN H. YOST
BY
ATTORNEYS

Jan. 18, 1966 V. H. YOST 3,229,883
WELDING SKATE AND TRACK
Filed April 17, 1964 6 Sheets-Sheet 3

FIG. 4

INVENTORS,
VAUGHN H. YOST

BY
ATTORNEYS

FIG. 5

Jan. 18, 1966  V. H. YOST  3,229,883
WELDING SKATE AND TRACK
Filed April 17, 1964  6 Sheets-Sheet 5

FIG. 6

INVENTORS
VAUGHN H. YOST

BY
ATTORNEYS

Jan. 18, 1966  V. H. YOST  3,229,883
WELDING SKATE AND TRACK
Filed April 17, 1964  6 Sheets-Sheet 6

*INVENTORS,*
VAUGHN H. YOST

BY
*ATTORNEYS*

United States Patent Office 3,229,883
Patented Jan. 18, 1966

3,229,883
WELDING SKATE AND TRACK
Vaughn H. Yost, 1009 E. Bob Wallace, Huntsville, Ala.
Filed Apr. 17, 1964, Ser. No. 360,784
23 Claims. (Cl. 228—25)
(Granted under Title 35, U.S. Code (1952), sec. 266)

The invention described herein may be manufactured and used by or for the Government of the United States of America for governmental purposes without the payment of any royalty thereon or therefor.
without the payment of any royalty thereon or therefor.

This invention relates to a welding skate and a track upon which the welding skate can be movably mounted. More particularly this invention relates to a welding skate having individually pivoted sets of wheels which can negotiate sharp curves on the track and to a track fabricated of a plurality of laminates that is easily bent to any desired shape and is reusable.

In the art of precision welding components of relatively large articles together such as, for example, tanks, ship hulls, etc., a track and skate combination is commonly utilized. The track is contoured to the shape of the article to be fabricated and is placed alongside and parallel to the seam to be welded. The skate, which generally supports an electric arc welding torch and other necessary apparatus, is placed on the track so as to be movable thereon. After the welding head is adjusted to form an arc at the point where the component edges meet, the skate is advanced along the track carrying the welding head. Suitable means are utilized to keep the welding head in alignment with the seam and to maintain an arc of constant length so that a uniform weld is obtained.

The track of the above described type is generally fabricated from an aluminum alloy plate in standard lengths of from 6 to 10 feet. A typical track will measure 6″ in width and be approximately ½″ thick. Bolt holes may be drilled in the track so that it can be secured to a mounting fixture positioned beside the weldment. Alternatively, vacuum cups are secured to the track so that it may be attached directly to the weldment.

The skate usually comprises a supporting carriage having wheels or cam followers mounted thereon and disposed so as to slidably or rollably secure the skate to the track. A skate driving means is mounted on the supporting carriage and imparts motion to the skate by reacting through a gear that is meshed with a toothed channel cut into the track itself or into a gear rack mounted on the track.

The one-piece, solid track of the type described hereinabove is extremely expensive, generally costing between 28 to 30 dollars per foot for straight lengths, thus greatly limiting or even prohibiting its use in many instances. If it is necessary to form the track to a particular curved configuration additional expense is incurred thereby raising the track cost still further. Furthermore, if the tracks are curved the teeth used in the driving means become distorted necessitating another expensive operation to relieve them so that jamming of the carriage drive means will not occur. Alternatively, the teeth may be milled as if they were on the surface of a cylinder to anticipate a later distortion. This operation requires special tooling and is again very expensive.

The skates used with these prior known tracks also presents several problems since they are usually closely fitted to the tracks which in most present day commercial devices precludes a track radius of curvature less than 5 to 7 feet. To compensate for this restriction on the radius of curvature, the skate cam followers or rollers often are set so as to be aligned with the curve which the track follows. This further limits the use of each particular welding skate and track to the specific job for which it was especially designed.

In summary, existing commercial tracks utilized in present day skate welding systems have numerous disadvantages not the least of which is that the track is expensive to produce and must be bent in a rather large radius to permit the skate to move therealong. If the skate carriage is constructed to follow a smaller track radius of curvature, it can then be used only on the specific weldment for which it was designed. Thus, the skate carriage and track lacks versatility and is in essence a "one-shot" system which cannot be readily modified or up-dated to accommodate those changes that must be made if the system being welded is to stay current with the art. Furthermore, obtaining a smooth drive between the skate and the track in existing devices has been found to be very difficult since, when the track is bent, the track gear teeth are distorted and the gear teeth of the drive unit often do not uniformly mesh with the track teeth along these curved portions. Such distortion results in uneven driving speeds and hence uneven welding. Still other disadvantages result when the track must be formed to a specific configuration. In such cases it must be custom made which naturally results in a relatively long lapse of time between the order date and delivery. Further, if a section of custom bent track is damaged a new section must be fabricated which, besides being expensive, causes delay in the welding operation being performed.

The present invention overcomes these above enumerated disadvantages of prior art devices by utilizing a track built from laminates of thin material combined with a bendable drive element on the track against which a "floating" carriage drive can react. The various laminates from which the track is formed are thin and can be moved longitudinally relative to one another. Therefore, the track may be easily bent to any configuration within the proportional limits of the materials utilized and, after being formed in the desired shape, fastening elements such as a nut and bolt combination can be used to secure or clamp the laminates immovably together. When another shape is needed, the clamping means is released and the track is reformed to meet the new requirements.

In one embodiment of the present invention, a standard roller chain made up of cross roller members and links pivotally secured to one another, is utilized as a means against which a driving sprocket on the skate carriage reacts. By the use of such a flexible drive chain, the problems associated with the bending of the track having gear teeth cut therein or mounted thereon are eliminated. If necessary the roller chain may be disposed in a T-shaped slot cut in the track and held therein by standard eared attachment links disposed in the cross of the T.

The usual sprocket gear teeth are roughly triangularly shaped so that they may be guided into the spaces between the cross roller members on the chain. Obviously the best driving impulse is obtained when the pitch line of the chain is tangent to the pitch circle of the sprocket. To maintain this optimum condition, the sprocket is mounted in a "floating" gear box which is movable about a fixed point on the skate. This gear box and sprocket are spaced a constant distance from the track and flexible chain drive by a wheel which extends outwardly to bear against the track. The wheel is held against the track by a compression spring which reacts between the skate carriage and the "floating" gear box.

To further reduce variations in the speed at which the carriage moves, a second flexible chain may be placed in the slot side by side with the first flexible chain. The cross roller members on one chain are disposed so that they lie substantially at the midpoint of the distance between the cross roller members of the other chain. Similarly, two driving sprockets are mounted in the gear box with the teeth of one located one half the distance between the teeth of the other. With this arrangement, the lag between the time one sprocket tooth ceases to engage the cross member at the point on the tooth intersected by the pitch circle and the next tooth begins to engage the cross member at this point, is cut by one-half.

In other embodiments of the invention a friction drive means is utilized. In one of these embodiments, a groove having the shape of the outer peripheral face of a V-belt pulley is milled into the side of the track and, instead of a drive sprocket, a friction wheel having a peripheral face shaped to complement the shape of the groove is positioned to run therein. This in effect creates a pulley of infinite radius and a belt of infinite length, and, as is well known, a pulley and belt drive is capable of efficiently transmitting a very large amount of power. Friction can also be produced by utilizing a knurled strip down the side of the track combined with a flat faced friction drive wheel mounted in the gear box. With the face of the drive wheel pressure against the knurled strip, sufficient friction is produced to move the carriage along the track.

The carriage of the instant invention is supported on the track by two sets of rollers which are each independently rotatably mounted. Each set includes an upper and lower truck element upon which are mounted a plurality of roller members some of which engage one side of the track and some the other. The axles of the rollers on one track side are disposed in a plane which is at a ninety degree angle to the plane of the axle of the roller on the other track side. All the axles are disposed in planes which intercept the vertical plane of the track at a forty-five degree angle.

Accordingly, it is an object of this invention to provide a track which can be readily formed to a desired configuration so that a welding skate can be accurately moved along the seams of a weldment.

It is another object of the invention to provide a formable track with a flexible reaction element which is not effected by bending.

Still another object of this invention is to provide drive means to react against the drive rack and move the welding skate at a smooth constant speed even though a curve on the track is being negotiated.

A still further object of this invention is to provide a welding skate which is able to negotiate relatively sharp turns on the supporting track without binding and without any appreciable change in the distance between the welding torch and the weldment.

Yet another object of this invention is to provide a skate which can be used on tracks having wide variations in radii of curvature without any modification of the track or skate being required.

These and other objects and advantages of this invention will be more apparent upon reference to the following specification, appended claims, and drawings wherein:

In order to better understand the construction and use of this novel powered carriage and track, it will be described in relation to a welding operation. It is to be understood, however, that various other uses may be found for this invention. For example, it could be used to carry various machine tools such as a power grinding wheel, milling cutter, or polishing wheel. Other uses will be readily apparent to those skilled in the art.

Figure 1:
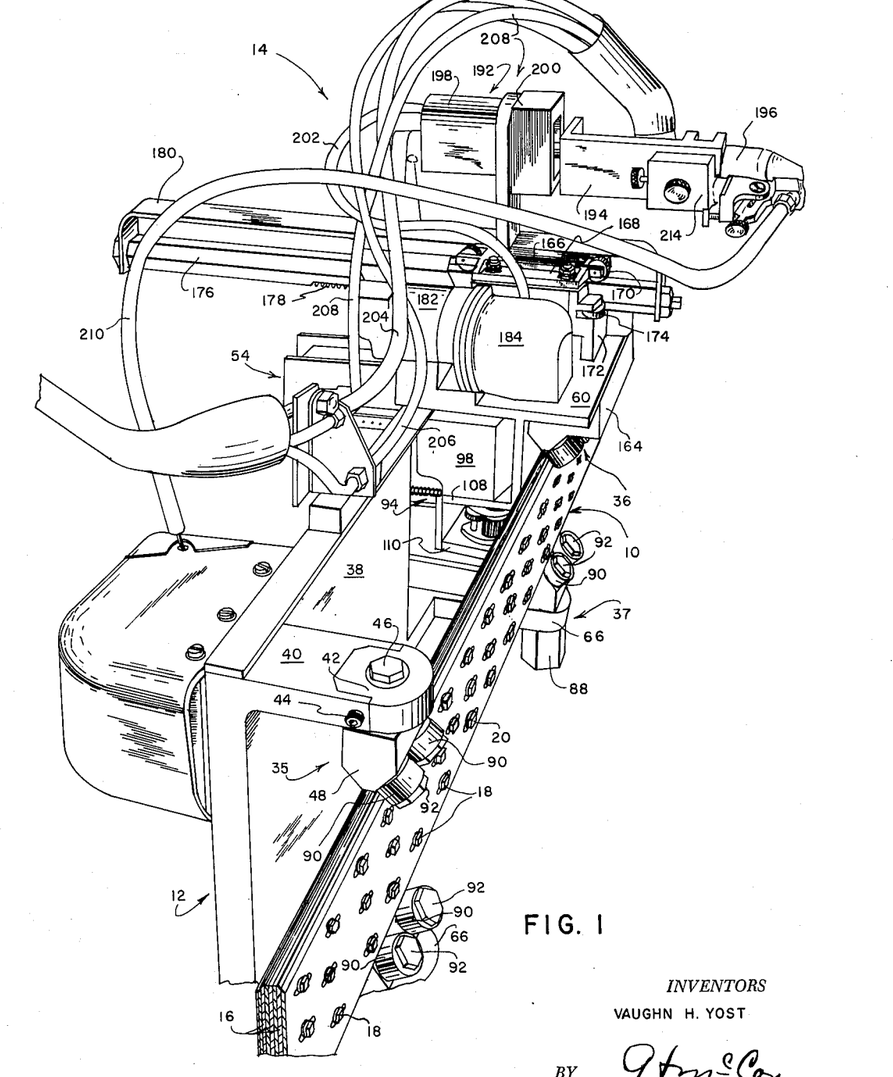
FIGURE 1 is a perspective view showing a welding head supported on a power driven carriage mounted on a laminated track, both of the latter two members embodying features of the present invention.

With continued reference to the accompanying figures wherein like numerals designate similar parts throughout the various views, and with initial attention directed to FIGURE 1, reference numeral 10 designates a section of a laminated track or rail upon which a powered carriage or skate 12 is movably mounted. A welding head 14 is secured to the carriage 12 and is movable therewith. A plurality of the track sections 10 can be secured together in a manner to be described to form a trackway of any desired length and shape.

Each section of track or rail 10 is fabricated from a plurality of laminations 16 which are thin sheets of metal or other suitable material of equal length having a number of closely spaced, elongated apertures 18 punched therethrough. Extending through each aperture 18 is a nut and bolt or other suitable fastening assembly 20 which, when tightened against the outermost sheets, serve to firmly clamp the laminations together. As shown in FIGURES 2–4, 6 and 7, a single flexible roller chain 22 or a pair of such chains 22' can be disposed in a T-shaped slot 24 formed in a side of the track 10 for a purpose to be later described in detail. The track may also be modified in a manner shown in FIGURE 8 by milling a groove or channel 26 down one side, or in the manner shown in FIGURE 9 by imprinting a knurled surface 28 on a side of the truck. The purpose of these modifications will also be subsequently described. Chamfers 30 are cut on the edges of the upper and lower track surfaces at a 45 degree angle to the plane of the track to provide a bearing surface on which the powered carriage 12 may rest.

Figure 2:
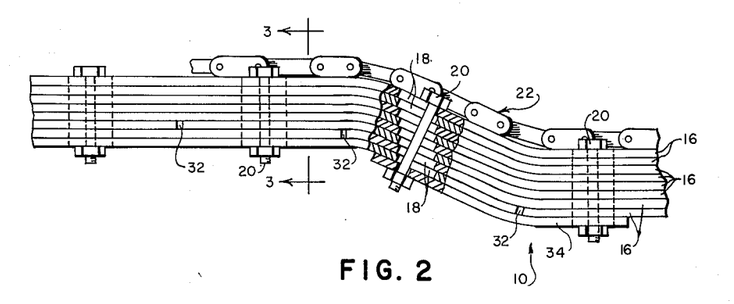
FIGURE 2 is an enlarged, fragmentary top view, with a section thereof broken out showing a curve formed in a laminated track constructed in accordance with one embodiment of the invention.
Figure 3:
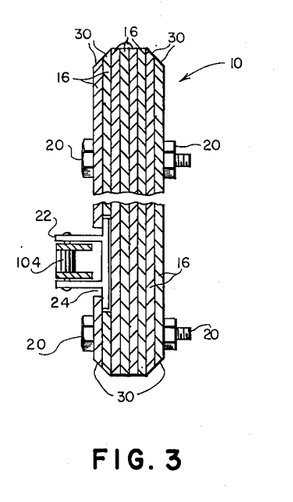
FIGURE 3 is a broken sectional view of the structure illustrated in FIGURE 2 taken along line 3—3 thereof.

FIGURE 2 provides the best illustration of the manner in which a track section 10 may be bent to form smooth curves. When the fastening assemblies 20 are loosened, the laminations 16 are free to slide relative to one another to the limit allowed by the interaction between opposed faces of apertures 18 and fastening assembly 20. Due to their inherent flexibility and the freedom of relative movement, the several laminations 16 and hence the track section 10 may be easily bent to the shape desired. After the bending is completed the fastening assemblies 20 are tightened to clamp the laminations together and maintain the chosen configuration. As long as the proportional limit of the material of the laminations is not exceeded the track may be formed to a new configuration and reused an infinite number of times.

The flexible roller chains 22 and 22' are of a conventional type having lengths pivotally joining adjacent crosspiece rollers. This construction allows the chain to be bent or folded with complete freedom and without distortion. Thus, when a track section 10 is curved, the chains 22 and 22' will follow the track curvature without change in spacing between adjacent rollers. As compared to the expense required to maintain uniform spacing between the teeth usually milled into the side of the track, the cost of a roller chain is very low.

In the assembly of a section of track 10, it is preferred that each lamination 16 be shifted one set of apertures 18 to produce a beveled effect on both ends. Therefore, when several track lengths are secured together, lap joints rather than butt joints are formed at the point of junction. This is obviously desirable since it minimizes the tendency for the several lengths to spring away from each other along a curve. This bevel effect is clearly shown in FIGURE 2 wherein the point at which three laminations on one section of track 10 meet three of the laminations on the adjoining section of track is identified by reference numeral 32.

A small space may separate the ends of the laminations of adjoining sections at point 32 due to the different radius of curvature of each individual lamination along a particular track curve. Again, the beveled effect described above is advantageous in that no two spaces are in alignment across the track and hence, no definite joint in the track is ever detected by any device riding therealong. The space 32 between the outer lamination 16 may be covered by a plate 34 if such is deemed desirable. Of course these spaces may also be eliminated by the adjustment afforded by the elongation of apertures 18.

While the bevel is described as being produced by shifting laminations of equal length the distance between one aperture, it is obvious that the same result could be obtained by merely joining a plurality of laminations of unequal length. It is also obvious that, if desired, a laminated track section could be joined to a track section fabricated from a solid piece of material beveled or stepped to accommodate the several laminations.

In a preferred embodiment of this invention the flexible track is fabricated from twelve aluminum alloy laminations each of which is one-sixteenth of an inch thick. Punched into each lamination are a plurality of slots each measuring one-fourth of an inch wide by five-eighths of an inch long. These slots are spaced on two inch centers and arranged in three vertically spaced rows. The fastening means constitute quarter inch bolts and complementary nuts.

The carriage or skate 12 is movably supported on the track 10 by upper front and rear truck follower units 35 and 36, respectively, and lower front and rear truck units 35'. A supporting element or plate 38 serves to both interconnect the truck units and as a base upon which various parts of the welding machine can be mounted.

Figure 5:
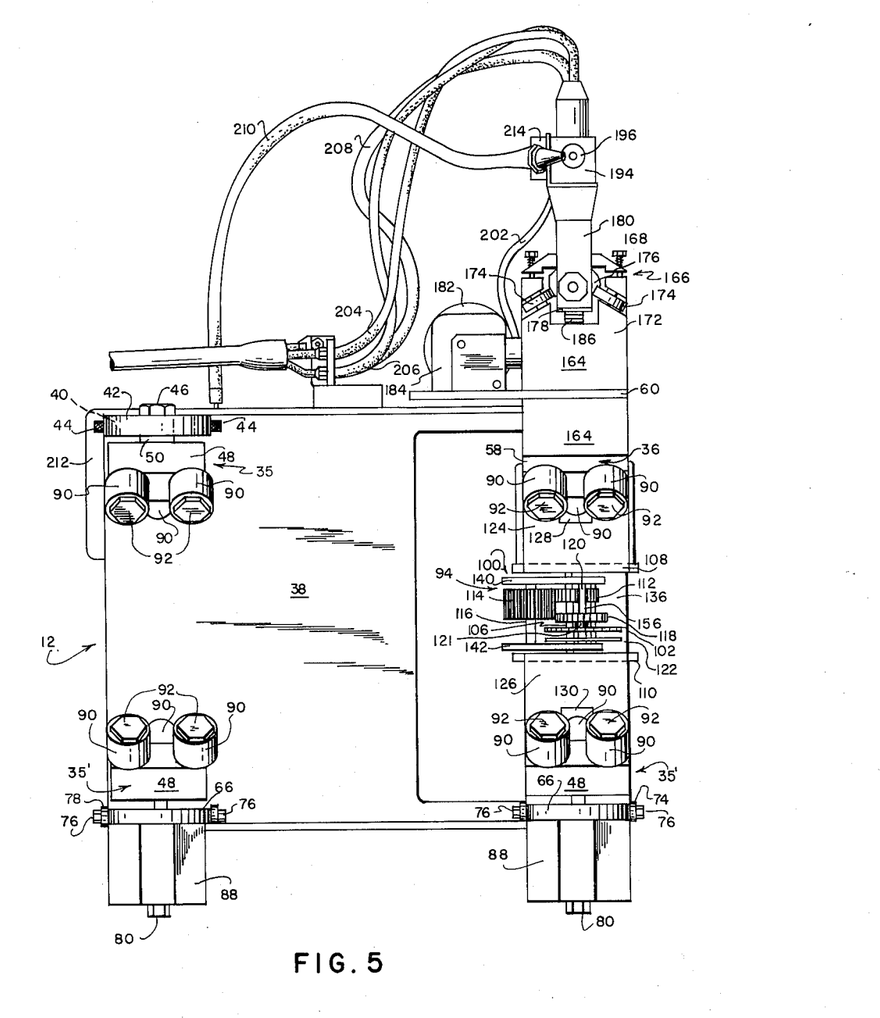
FIGURE 5 is a side view partly broken away of the powered carriage and the drive means therefore constructed in accordance with an embodiment of the invention.

As best shown in FIGURES 1 and 5, the upper front follower truck 34 is mounted in a supporting disk 42 secured in a bifurcated mounted ear 40 by Allen head bolts 44. An axle bolt 46 is threaded into the truck block 48 and extends through a bearing in the disk 42 so that it, and hence the truck unit, is free to rotate relative to the carriage 12. A washer 50 is used to separate the disk 42 and the truck block 48. The spacer 50 rests on the bearing in the disk 42 in order to minimize friction between these elements.

Figure 6:
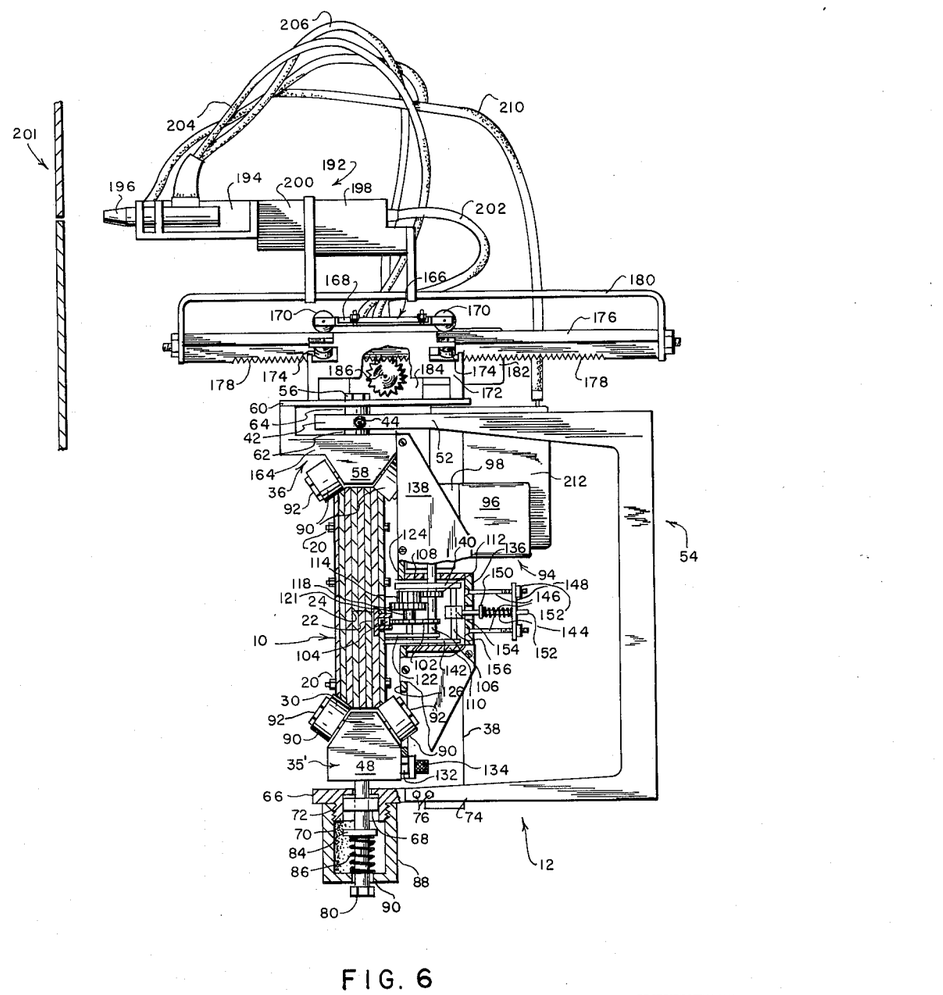
FIGURE 6 is an end view partly in section and with portions thereof broken away of the carriage structure shown in FIGURE 4 as it appears mounted upon a laminated track.

The rear upper follower truck unit 36 is also mounted in a supporting disk 42 which is secured by Allen head bolts 44 within the bifurcated upper mounting arm portion 52 of a U-shaped channel member 54 (see FIGURE 6). Again, an axle bolt 56 is threaded into the truck block 58 and extends through a bearing in the supporting disk 42 so that the truck unit 36 can rotate relative to the supporting arm 52 and the carriage 12. The axle bolt 56 extends above the surface of disk 42 and through an aperture in a plate 60 for a purpose to be later described. Spacers 62 and 64 are used to separate the disks 42, the truck block 58, and the plate 60.

Both the front and rear lower truck units 34 are pivotally supported in elongated mounting plates 66 having apertures 68 extending therethrough which, as shown in FIGURE 6, are surrounded by depending integral rings 70 having a threaded portion 72. The rear mounting plate 66 is secured within the lower bifurcated mounting arm portion 74 of the U-shaped channel member 54 by bolts 76 which extend through apertures in the arm 74 and are threaded into the plate. The forward mounting plate 66 is likewise secured by bolts 76 to a bifurcated mounting arm 78 secured to the supporting plate 38 and extending outwardly parallel to mounting ear 40.

An axle bolt 80 is threaded into the block portion 48 of each of the lower truck units 34 and, as best illustrated in FIGURE 6, extends through and is slidable relative to a bearing unit 82 press fitted into the aperture 68. A flange 84 extends outwardly from the bolt 80 to provide a reaction point against which the compression spring 86 may exert an upwardly directed force. The hexagonally shaped housing 88 is threaded onto the ring 70 and serves as a second reaction point for the compression spring 86.

Each truck unit includes three wheels 90 rollably secured thereto by axle bolts 92 which are threaded into their respective truck blocks 48 or 58. As illustrated in FIGURES 5 and 6, a pair of the wheels 90 are secured to the side of each truck unit which is furthest from the skate 12 while the third wheel 90 is set on the truck side closest to the skate 12. Of course it is obvious that this arrangement could be reversed if desired. The axles of the pair of wheels lie in a plane which is normal to the plane of the axis of the third wheel and which is disposed at an angle of 45 degrees to a vertical plane passing through the pairs of upper and lower trucks and through the track 10. The three wheels on each truck are longitudinally spaced on one inch centers in the preferred embodiment, and are horizontally spaced at a distance such that they will rest upon the track chamfers 30.

Since each truck is independently pivoted rather than fixed on a straight or arcuate line as are presently available commercial devices, the skate can negotiate curves that are relatively sharp and which vary widely in radius. It has been found in practice, however, that as the skate 12 is moved along a curve the truck units will either tend to bind on or slide down the sides of the track. This situation is obviously highly undesirable since binding may slow or stop the skate completely while sliding and the loss of a tight fit with the track will cause the skate to rock thus varying the distance between the welding head and the weldment.

In order to correct for this deficiency its cause must be understood. If each wheel on a truck is divided into three equal sections by vertical planes perpendicular to the vertical plane of the track, the middle third only of each wheel will touch the track 10 when it is formed in straight sections. A line drawn from the touching point on the middle third of the single wheel to the touching point on the middle third of each of the pair of wheels, equals the effective track width in this circumstance. When the track is concave on the same side on which the pair of wheels are mounted, the tendency is for the outer thirds of these wheels to touch the track while the middle third of the single wheel continues to rest on the track. In this circumstance, the effective track width is equal to the length of a line from the touching point at the middle third of the single wheel to the touching point at the outer third of either of the pair of wheels. Obviously this line is longer than the line between touching points when straight track is involved and hence, to the truck, the track appears to be wider. Thus, as the trucks pass over a section which is curved in the aforesaid manner, forces are produced which tend to push the wheels outwardly away from the trucks and one another.

As explained previously, the surface of the track upon which the wheels rest and the wheels themselves lie in planes disposed on opposite sides and at a forty-five degree angle to the vertical plane of the track. Since the wheels are all fixed relative to their respective truck blocks, the forces are transmitted to, and act directly on these members. Thus, upwardly directed forces lying in the same plane as the upper chambers and wheels are directed against truck blocks 48 and 58 while downwardly directed forces lying in the same plane as the lower chamfers and wheels are acting on the truck blocks 48 disposed on the lower edge of the support plate 38.

Using well known principals, the angular forces described above may be resolved into their vertical and horizontal components. The horizontal forces on truck blocks 48 and 58 are all equal and opposite so they cancel one another out. The vertical components are counteracted by equal and opposite forces which are produced by compressing the coil springs 86. As best shown in FIGURES 5 and 6, the upwardly directed force component is transmitted to the spring 86 through the plates 40 and 42, the channel 54 and carriage 38, and the housing 88. The downwardly directed force is transmitted to the spring 86 through the axle bolt 80 and flange 84. By absorbing this vertically directed force it has been found that binding of the wheels on the track is prevented while at the same time the position of the welding head 14 relative to the weldment is not materially changed.

When the curve of the track is convex on the side upon which the pair of wheels are mounted, the inner thirds of those wheels and the outer third of the single wheel tend to rest on the track. In this circumstance the track appears to the truck to be more narrow since a line drawn from the touching points on the inner thirds of either of the pair of wheels to the touching points on the outer third of the single wheel is shorter in length than the line between touching points where the track section is straight or concavely curved. Thus, in this circumstance, the upper trucks 34 and 36 would tend to slide down the sides of the track. Springs 86 push the lower trucks 34 upwardly, however, so that the track is received at a point between the wheels which is closer to the lower truck blocks 48. Since the horizontal distance between the wheels is less at this point, the track is gripped as it would be along a straight section and a reaction is produced which acts through supporting plate 38 to keep the upper trucks 34 and 36 in an essentially constant position in the vertical plane. As before, the position of the welding head relative to the weldment does not change materially.

In order to move the welding head 14 along the weldment, a driving assembly is mounted on the skate 12 in such a manner that an element of it is in contact with reacting means on the track 10. In the embodiment illustrated in FIGURES 2, 3, 5, and 6, the reacting means comprises a single flexible roller chain 22 disposed within a T-shaped slot 24 and securely anchored to the track at its ends. As illustrated in these figures, the driving assembly 94 includes an electric motor 96, a gear box 98, and a floating gear box 100. The teeth on a sprocket 102 which is driven by the motor 96 in a manner which will be described below, mesh with rollers 104 on the chain 22. Therefore, as the sprocket turns, its teeth react with successive rollers 104 to move the skate 12 and hence the welding head 14 along the track 10.

The sprocket 102 is driven by an electric motor 96 connected through a gear box 98 to a drive shaft 106 which extends through an aperture in the upper plate 108 and terminates in a ball bearing in the lower plate 110. A drive gear 112 is secured to the shaft 106 in such a position that it will mesh with an idler gear 114 mounted on a first shaft 116. A spur gear 118 is rotatatbly and vertically slidably secured to a second shaft 120 in such a manner that it meshes with idler gear 114. The sprocket 102 is pressed onto a hub 121 integral with the spur gear 118 so that it rotates and slides with that gear on and about the second shaft 120. Spacing disk 122 is also rotatably secured to the second shaft 120. From the foregoing it is obvious that as drive shaft 106 is rotated the gear 112 drives idler gear 114 which in turn rotates the spur gear 118 and the sprocket 102 through the hub 121.

The driving assembly 94 is supported on a bridge which, as shown in FIGURES 5 and 6, includes an upper plate 108, a lower plate 110, an upper front plate 124, and a lower front plate 126. Both of the latter elements have openings 128 and 130, respectively, to accommodate the single wheel 90 on the front trucks 34 and 36. The upper front plate 124 is securely fastened to the block 58 while the lower front plate 126 contains a vertically elongated slot 132 through which fastening element 134 extends. The fastening element 134 is threaded into block 48 which therefore remains free to move in a vertical direction to a limited extent. Completing the supporting bridge are a back plate 136 secured to plates 108 and 110 and a reinforcing element 138 interconnecting all the other bridge elements to thereby strengthen that assembly.

The drive motor 96, the gear box 98, and the gear train including the sprocket 102 are all mounted on the support bridge and, since this bridge is secured only to the front upper and lower trucks, the entire assembly pivots with and about the same point as those trucks when a curve in the track is being negotiated. It is obvious, however, that as the pair of wheels 90 on each truck are spaced two inches apart longitudinally of the track, the line followed by the trucks will not be a smooth curve but will consist of a series of angularly related two inch chords, tangents, or secants. When the track is concave to the side on which the skate is located there will be a series of chords. When convex to the side on which the skate is located there will be a series of tangents. Where the convex curve has a very small radius of curvature there will be a series of two inch secants.

The sprocket 102 is positioned so that the intersection of the pitch circle with the active driving tooth is at a point midway between the pair of wheels. It may be seen then that, depending on whether the curve of the track is concave or convex, the distance of this point from the track and chain will vary. If the curve is concave the point will be on the chord while if it is convex the point will lie on at tangent or a secant. Thus, the point at which the driving tooth of the sprocket engages the chain cross members may vary all the way from the tip, to the base. Since in most gears the distance between the tips of the adjoining teeth is greater than the distance between the bases of the same teeth, the timing of the drive impulse will vary according to the shape of the curve of the track, and the motion of the skate will therefore be uneven. To overcome this problem the gear train is mounted in a gear box which "floats" relative to the supporting bridge so that it is spaced such a distance from the track that the pitch diameter of the sprocket will maintain a constant position relative to the chain drive.

As best shown in FIGURES 5 and 6, the first and second shafts 116 and 120 are secured between the upper and lower gear box plates 140 and 142, respectively, and terminate therein. These plates are pivotally secured to the drive shaft 106 so that they, and the gear box of which they are a part, may swing in an arc having its center of curvature at that shaft. As described above, the spacing disk 122 is mounted on the second shaft 120 and bears against the track 10. Since, as again clearly shown in FIGURES 5 and 6, the second shaft 120 is offset from the drive shaft 106, a force is produced by the reaction of the disk 122 against the track which tends to push the gear box along the aforedescribed arc away from the track 10.

To counteract the force produced by the reaction between the wheel 122 and the track 10, and equal opposing pressure is exerted on the gear box by compression spring 144 in the following manner. A pair of countersunk headed bolts 146 are loosely mounted in a counterbored aperture in the back plate 136 and extend outwardly and terminate in threaded ends. Slidably mounted on the threaded ends of bolts 146 is a connecting plate 148 which serves as an outer bearing point for the spring 144. The inner bearing point for this spring 144 is provided by a flange 150 formed on a rod 152 which extends through the spring with its inner end secured to a bushing 154 pivotally attached to a gear box plate spacing and support member 156. The connecting plate 148 is also slidable on the outer end of rod 152, and to prevent it from being forced off the rod fastening elements such as nuts 158 are threaded onto the ends of bolts 146. In addition to securing the connecting plate to the assembly, these nuts 158 can also be used to move the connecting plate 148 closer to back plate 136 and hence, compress the spring 144 to vary the force with which disk 122 is pressed against the track 10.

From the foregoing description of structure it is obvious that no matter what the distance between the support bridge and the track may be, the distance between the gear box and the track will be constant. Therefore, the sprocket can be set so that its teeth mesh with the flexible chain at a given point with the guarantee that contact will be maintained at that point even if a sharp curve is being negotiated. As a result the reaction point on the teeth will always be the same and the skate 12 will travel along track 10 at a smooth, constant speed.

Figure 4:
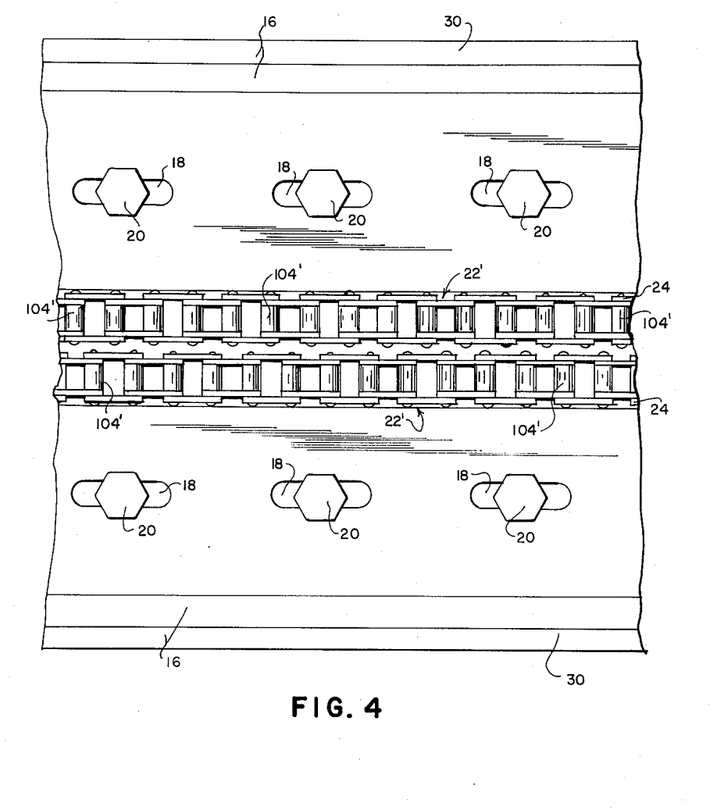
FIGURE 4 is a side view showing a fragment of the laminated track having a pair of link chains according to another embodiment of the invention.
Figure 7:
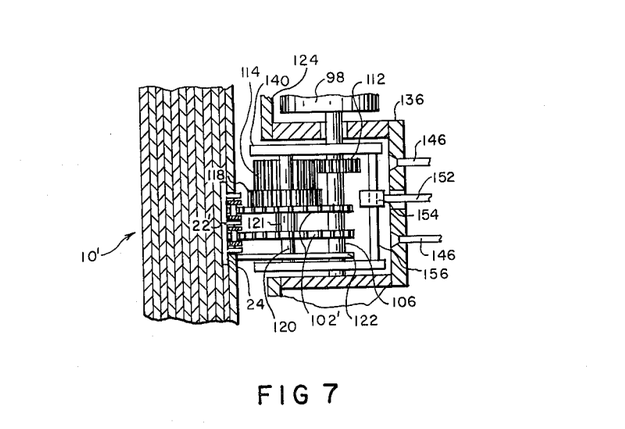
FIGURE 7 is a fragmentary, enlarged end view of the carriage drive means according to a modified form of the invention.

In the embodiment of the invention illustrated in FIGURES 4 and 7, two identical sprocket wheels 102' are pressed on the hub 121 instead of one, and, as best shown in FIGURE 4, a pair of flexible chains 22' are arranged side by side so that the rollers 104' on one are aligned with the space between the rollers 104' on the other. Likewise, the teeth on one of the sprockets are aligned with the spacing between the teeth on the other sprocket. This arrangement results in an even smoother motion of skate 12 as compared to the driving assembly illustrated in FIGURES 5 and 6 since the time during which the drive impulse is created by engagement of a cross member and a tooth at the pitch circle is doubled. It is obvious that if desired three or more chains and driving sprockets could be used. In all other aspects this drive means is the same as that illustrated in FIGURES 5 and 6 including the "floating" feature.

While the spacing element has been described above as a disk 122, it can also be seen that other structural members could also be utilized to perform this task. For example, a thin plate-like element of self-lubricating, wear resistant material such as Teflon could be immovably secured to one of the gear box plates 140 or 142 so that it will extend outwardly to bear against the track.

Figure 8:
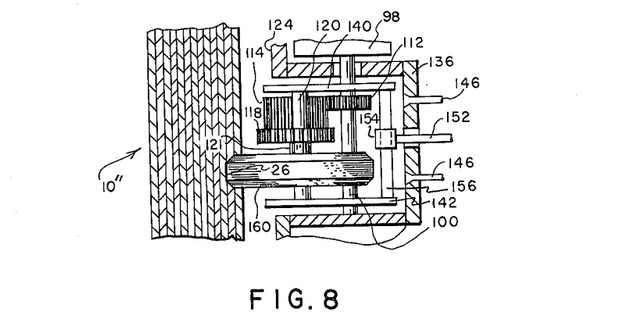
FIGURE 8 is a view similar to FIGURE 6 but showing another modified form of the carriage drive.
Figure 9:
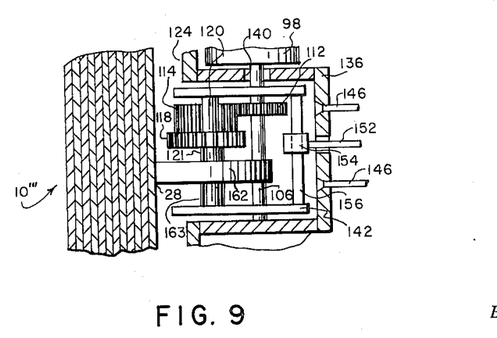
FIGURE 9 is a view similar to FIGURE 6 but showing still another modified form of the carriage drive.

The embodiments of the invention illustrated in FIGURES 8 and 9 include a gear train and "floating" gear box which are identical to that shown in FIGURES 5 to 7 with the following exception. Instead of a sprocket and flexible chain drive, motion is imparted to the skate 12 by a friction reaction drive. In the embodiment shown in FIGURE 8, a V-shaped groove 26 corresponding to the peripheral face of a pulley is milled in one side of the track 10' and a wheel 160 fabricated from a friction producing material such as neoprene is formed so that its peripheral face compliments the shape of the groove. This wheel is pressed onto the hub 121 similarly to sprockets 102 and 102'. Thus, the wheel 160 is equivalent to a V-belt of infinite length while the groove 26 is equivalent to a pulley having an infinite radius. As is well known, a V-belt and pulley are capable of transmitting power in a very efficient manner and, therefore, when power is applied to the wheel 160 seated in groove 26, the skate will be smoothly driven along the track 10'. A variation of this drive would be the use of a plurality of wheel-pulleys around which a V-belt of friction producing material is stretched. The V-belt is pressed into the groove on the track by the wheels at least one of which is driven by the power source. The area of surface contact is thereby increased several fold and the efficiency of the driving mechanism rises proportionately.

The friction drive shown in FIGURE 9 consists of a wheel 162 fabricated again from a friction producing material such as neoprene pressed onto the hub 121 and bearing against a roughened or knurled surface 28 on a side of the modified track 10". In all of the above described embodiments, the wheels 160 and 162 also perform the function of the spacing disk 122 which is therefore eliminated. A spacer 163 is provided in the embodiment illustrated in FIGURE 9 to maintain the wheel 162 in contact with knurled surface 28.

The manner in which the welding head 14 is mounted on the skate 12 in all the embodiments of the invention is best shown in FIGURES 1, 5, and 6. The upper, rear truck block 58 includes an outwardly and upwardly extending lip 164 to which the outer edge of the plate 60 is secured. A second mounting point is provided by the washer 64 upon which the plate 60 rests in such a way that it remains free to slide relative thereto. As explained before the axle bolt 56 extends through an aperture in the plate 60 to provide a point about which it may pivot. Thus, the plate 60 pivots with and about the same point as the upper front truck.

Mounted upon the plate 60 is a saddle 166 which is composed of an upper portion 168 to which wheels 170 are pivotally secured, and a lower portion 172 to which wheels 174 are pivotally secured. Slidably clamped between the wheels 170 and 174 is the barrel 176. Gear teeth 178 are milled on the lower edge of the barrel 176 while secured on the upper side of the barrel is a supporting angle 180.

Also mounted on the plate 60 is an arc voltage control motor 182 which has its output torque mechanically connected through a gear box 184 to a spur gear 186 whose teeth mesh with the teeth 178 on the barrel 176. As the spur gear 186 is driven the barrel 176 will be moved in a horizontal plane perpendicular to the vertical plane of the track 10.

Secured to the supporting angle 180 by clamps 188 and 190 is a cross seam positioning device 192 carrying at its outer end a supporting bracket in which torch 196 is mounted. The purpose of the cross seam positioner 192 is to provide limited adjustment in a vertical direction independently of the other elements of the welding head and carriage. The operation of the cross seam positioner may be either manual or automatic and is accomplished by an electric motor 198 whose rotary output is translated into a vertical motion in a gear box 200.

As shown in FIGURES 5 and 6, the torch 196 is mounted in a plane extending through the center line of front trucks 34 and 36 and through the axle bolt 56. The torch thus pivots with and about the same point as the front trucks and for this reason can be used to weld along any curve which has a chord as small as two inches. This is a tremendous improvement over many existing devices where the torch is set midway between the followers and is therefore restricted in usefulness to a radius of curvature having a relatively long chord.

To adjust the distance between the weldment 201 and the torch, the barrel 176 is moved in the manner previously explained. Control of this movement is obtained by continuously measuring the voltage drop across the arc formed between the torch and the weldment and maintaining such constant. If the torch begins to move away from the weldment the resistance between these elements increases and hence the voltage drop increases. This increase is sensed and transmitted through wiring in a conduit 202 to operate a switch and start the motor 182 which moves the barrel 176 toward the weldment until the proper voltage drop is again obtained. Conversely, the barrel is moved away from the weldment when the voltage drop decreases.

The skate and track of this invention may be used with any type of welding process. As illustrated, however, the torch 196 is of the type adapted to utilize the tungsten inert gas process and as such is jacketed so that cooling water may be circulated therethrough. This water is supplied through a hose 204 and removed through a second hose 206. The supply hose also contains the power supply lead which is surrounded by the cooling water to minimize electrical losses due to heat. An inert gas such as helium is supplied to the welding head through a third hose 208.

Welding wire is supplied to a point adjacent the torch through a conduit 210. The wire is stored and supplied from a conventional motorized reel contained in the housing 212 and precision fed into the arc by an adjustable wire guide 214. As best shown in FIGURE 1, the reel is mounted adjacent the forward end of plate 38.

It will be apparent that by utilizing the teachings of this invention, a vastly improved welding skate and track therefor can be made. The track is easily curved and may be used over and over again. The skate likewise may be used on a great variety of different jobs without modification. Furthermore, since independently rotatable trucks are used the skate can negotiate sharper curves than has heretofore been possible.

The driving means of this invention is also a great improvement over the devices known in the prior art in that a flexible chain or chains not affected by bending are attached to the track. Alternatively, friction drives may be used. To provide the driving force necessary to move the skate, a gear box, which is driven by an electric motor, is mounted on the skate in such a manner that it may move relative thereto and maintain a constant contact point between the driving sprocket and the cross members on the chain. Thus, a smooth, constant skate motion is obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meeting and range of equivalency of the claims are therefore intended to be embraced therein.

What is claimed is:

1. A machine for movably supporting welding apparatus comprising:
 (a) a plurality of relatively thin laminations placed in face to face relationship to form a track;
 (b) fastening means having portions in contact with said track and forcing the several laminations together to form a compact structure;
 (c) reaction means on said track;
 (d) a support member;
 (e) a plurality of follower means secured to said support member and resting upon said track whereby said support member may be moved along said track; and
 (f) drive means pivotally secured to said member whereby it may constantly engage said reaction means on said track so that no variations in driving impulse will occur.

2. A machine according to claim 1 wherein at least one of said follower means is secured to said support member so as to be movable in a vertical plane.

3. A machine according to claim 2 wherein means for forcing said follower means toward said track is interposed between said supporting member and said follower means.

4. A machine for movably supporting apparatus comprising:
 (a) an elongated track adapted to be supported next to a workpiece and including
  (1) upper and lower sides,
  (2) inner and outer sides, and
  (3) chamfers on the elongated edges joining said upper and lower sides with said inner and outer sides;
 (b) a supporting element having an upper portion and a lower portion;
 (c) a plurality of truck blocks;
 (d) means mounted on said upper portion pivotally securing at least one of said trucks to said upper portion;
 (e) means mounted on said lower portion pivotally and slidably securing at least one of said trucks to said lower portion;
 (f) a plurality of wheel elements mounted on each truck block so that at least one of said wheels contacts the inner side chamfer and at least one of said wheels contacts the outer side chamfer;
 (g) resilient means interposed between said means mounted on said lower portion and said truck mounted therein for forcing said truck toward said track whereby said wheels will be maintained in close fitting relationship thereto; and
 (h) means on said supporting element for moving it along said track.

5. A machine according to claim 4 wherein a pair of said wheels mounted on each of said trucks contacts one of said chamfers and a single wheel contacts the other chamfer.

6. A machine according to claim 5 wherein said pair of wheels are spaced apart and said single wheel is mounted at a point between said pair.

7. A machine for movably supporting welding apparatus comprising:
 (a) an elongated track adapted to be supported next to a workpiece and having:
  (1) upper and lower sides,
  (2) inner and outer sides, and
  (3) chamfers on the elongated edges joining said upper and lower sides with said inner and outer sides;
 (b) a supporting member having an upper portion and a lower portion;
 (c) a plurality of truck blocks;
 (d) a pair of wheels secured to one side of each of said truck blocks and
  (1) spaced from one another and
  (2) contacting one of said chamfers;
 (e) each truck also having a single wheel secured to the side opposite that to which the pair of wheels are secured
  (1) at a point between said pair and
  (2) contacting the other of said chamfers;
 (f) two mounting means spacedly secured to said upper portion, each pivotally receiving one of said truck blocks;
 (g) two bearings spacedly secured to said lower portion;
 (h) an axle member extending outwardly from two of said truck blocks and including a flange spaced from its respective truck block;
 (i) each of said bearings slidably and pivotally receiving one of said axle members;
 (j) resilient means interposed between each of said flanges and said supporting element to force said lower truck toward said track whereby any apparent change in track width when the wheels are negotiating a curve will be compensated for by forcing said truck blocks secured to said lower portion into contact with said track; and
 (k) means for moving said supporting member along said track.

8. A machine according to claim 7 wherein a welding head is secured to one of said truck blocks mounted on said upper portion.

9. A machine according to claim 8 wherein said welding head is mounted along a line passing through said single wheel mounting point and between said pair of wheels whereby said head will pivot with said truck.

10. A machine for movably supporting welding apparatus comprising:
 (a) an elongated track adapted to be supported next to a workpiece and including
  (1) upper and lower sides and
  (2) inner and outer sides;
 (b) reaction means on said inner side;

(c) a support plate;
(d) a plurality of follower means secured to said support plate and movably resting upon said track whereby said support plate may be moved therealong;
(e) a gear box supporting a gear train and pivotally secured to said support plate;
(f) drive means operatively secured to said gear box and engaging said reaction means;
(g) means interconnecting said drive means and said gear train; and
(h) means for impelling said gear train whereby motive force may be applied to said drive means to move said support plate along said track.

11. A machine for movably supporting apparatus comprising:
(a) an elongated track adapted to be supported next to a workpiece and including
 (1) upper and lower sides and
 (2) inner and outer sides;
(b) reaction means on said inner side;
(c) a supporting element;
(d) a plurality of follow means secured to said supporting element and movably resting upon said track whereby said element may be moved therealong;
(e) a drive shaft rotatably mounted on said supporting element;
(f) a drive gear secured to said drive shaft whereby motion imparted to said drive shaft is imparted to said gear;
(g) mounting means pivotally secured to said supporting element and rotatable about a line parallel to said drive shaft;
(h) a shaft rotatably supported in said mounting means;
(i) drive means secured to said shaft and engaging said reacting means;
(j) means for transmitting the motion of said drive gear to said shaft whereby the interaction of said drive means and said reacting means will move said supporting element along said track; and
(k) means reacting between said mounting means, said track, and said support member for holding said drive means in uniform contact with said reaction means.

12. A machine according to claim 11 wherein said means for transmitting the motion of said drive gear to said shaft comprises: an idler gear secured to another shaft rotatably supported in said mounting means; a spur gear secured to said shaft rotatably supported in said mounting means; said idler gear engaging said drive gear and said spur gear whereby movement of said drive gear is imparted to said drive means.

13. A machine for movably supporting welding apparatus comprising:
(a) an elongated track adapted to be supported next to a workpiece and including
 (1) upper and lower sides and
 (2) inner and outer sides;
(b) reaction means on said inner sides;
(c) a supporting element having upper and lower portions;
(d) a plurality of follower means secured to said support member and movably resting upon said track whereby said supporting element may be moved therealong;
(e) at least one of said followers being pivotally secured to said upper portion and at least one of said followers being pivotally secured to said lower portion;
(f) a support bridge secured to a pivotally mounted follower on said upper portion and a pivotally mounted follower on said lower portion whereby it will pivot with and about the same point as said followers;
(g) a motor mounted on said support bridge and including a depending drive shaft;
(h) a drive gear secured to said drive shaft whereby motion imparted to said drive shaft is imparted to said gear;
(i) mounting means pivotally secured to said drive shaft and rotatable about said drive shaft;
(j) an idler gear secured to a first shaft rotatably supported in said mounting means;
(k) a second shaft rotatably supported in said mounting means;
(l) drive means secured to said second shaft and engaging said reacting means on said track;
(m) a spur gear secured to said second shaft;
(n) said idler gear engaging said drive gear and said spur gear whereby movement of said gear is imparted to said drive means so that said supporting member is moved along said track;
(o) means reacting between said mounting means, said track, and said supporting element for holding said drive means in uniform contact with said reaction means.

14. A machine according to claim 13 whereas said reacting means comprises a flexible roller chain secured in a T-shaped slot in the inner side of said track and said drive means comprises a sprocket gear.

15. A machine according to claim 13 wherein said reacting means comprises a plurality of flexible roller chains secured in parallel relationship in a T-shaped slot in the inner side of said track; each said chain including a plurality of spaced cross roller members; the cross roller members of one of said chains aligned with the space between the cross roller members on the adjacent chain; said drive means comprising of plurality of sprocket gears in which the teeth of one are aligned with the valleys between the teeth on the adjacent sprocket.

16. A machine according to claim 15 wherein there are two of said chains and two of said sprockets.

17. A machine according to claim 13 wherein said reaction means comprises an elongated substantially V-shaped slot in the inner side of said track and said drive means comprises a wheel fabricated from friction producing material the outer peripheral face of which compliments the shape of said slot.

18. A machine according to claim 13 in which said reaction means is a roughened, elongated strip along the inner side of said track, and said drive means is a wheel fabricated from friction producing material.

19. A machine for movably supporting welding apparatus comprising:
(a) an elongated track adapted to be supported next to a workpiece and including
 (1) upper and lower sides and
 (2) inner and outer sides;
(b) reaction means on said inner side;
(c) a supporting element having upper and lower portions;
(d) a plurality of follower means secured to said supporting element and movably resting on said track whereby said element may be moved therealong;
(e) at least one of said followers being pivotally secured to said upper portion and at least one of said followers being pivotally secured to said lower portion;
(f) a support bridge secured to a pivotally mounted follower on said upper portion and a pivotally mounted follower on said lower portion whereby it will pivot with and about the same point as said followers;
(g) a motor on said support bridge and including a depending drive shaft;
(h) a drive gear secured to said drive shaft whereby motion imparted to said drive shaft is imparted to said gear;

(i) mounting means pivotally secured to said drive shaft and rotatable about said drive shaft;

(j) an idler gear secured to a first shaft rotatably supported in said mounting means;

(k) a second shaft rotatably supported in said mounting means;

(l) drive means secured to said second shaft and engaging said reacting means on said track;

(m) a spur gear secured to said second shaft;

(n) said idler gear engaging said drive gear and said spur gear whereby movement of said drive gear is imparted to said drive means so that said supporting member is moved along said track;

(o) a spacing disc secured to said second shaft and engaging said track at a point adjacent to said reaction means;

(p) a spacing and support member secured to said mounting means at a point substantially opposed to the track engaging point of said disc;

(q) a rod pivotally secured to said spacing and support member and including a flange; and (r) resilient means reacting between said support bridge and said flange to maintain said spacing disk in contact with said track whereby said drive means and said reacting means are maintained in a uniform relationship.

20. A machine according to claim 19 wherein said reacting means comprises a flexible roller chain secured in a T-shaped slot in the inner side of said track and said drive means comprises a sprocket gear.

21. A machine according to claim 19 wherein said reacting means comprises a plurality of flexible roller chains secured in parallel relationship in a T-shaped slot in the inner side of said track; each said chain including a plurality of spaced cross roller members; the cross roller members of one of said chains aligned with the space between the cross rollers on the adjacent chain; and said drive means comprises a plurality of sprocket gears in which the teeth of one are aligned with the valleys between the teeth on the adjacent sprocket.

22. A machine for movably supporting welding apparatus comprising:
(a) an elongated track adapted to be supported next to a workpiece and including
(1) upper and lower sides and
(2) inner and outer sides,
(3) chamfers on the elongated edges of said track joining said upper and lower sides with said inner and outer sides, and
(4) reaction means on said inner side;
(b) said track being formed by a plurality of thin, elongated, flexible laminations placed in face to face relationship;
(c) a plurality of elongated apertures spaced along each lamination and aligned with the apertures in the other laminations to form a passageway through said track;
(d) fastening means extending through said passageway and bearing against the outermost laminations to force the several laminations together and form a compact structure,
(1) the dimension of said fastening means extending in the direction of said aperture elangation being less than the extent of said elongation whereby the flexible laminations may be readily moved relative to one another and formed into a curve;
(e) a supporting element having an upper portion and a lower portion;
(f) a plurality of truck blocks;
(g) a pair of wheels secured to one side of each of said truck blocks and
(1) spaced from one another and
(2) contacting one of said chamfers;
(h) each truck also having a single wheel secured to the side opposite that to which the pair of wheels are secured
(1) at a point between said pair and
(2) contacting the other of said chamfers;
(i) two mounting means spacedly secured to said upper portion, each pivotally receiving one of said truck blocks;
(j) two bearings spacedly secured to said lower portion;
(k) an axle member extending outwardly from two of said truck blocks and including a flange spaced from its respective truck block;
(l) each of said bearings slideably and pivotally receiving one of said axle members;
(m) a resilient means interposed between each of said flanges and said supporting element to force said lower truck toward said track whereby any apparent change in track width when the wheels are negotiating a curve will be compensated for by forcing said truck blocks secured to said lower portion into contact with said track;
(n) a support bridge secured to a pivotally mounted truck on said upper portion and a pivotally mounted truck on said lower portion whereby it will pivot with and about the same point as said trucks;
(o) a motor mounted on said support bridge and including a depending drive shaft;
(p) a drive gear secured to said drive shaft whereby motion imparted to said drive shaft is imparted to said gear;
(q) mounting means pivotally secured to said drive shaft and rotatable about said drive shaft;
(r) an idler gear secured to a first shaft rotatably supported in said mounting means;
(s) a second shaft rotatably supported in said mounting means;
(t) drive means secured to said second shaft and engaging said reacting means on said track;
(u) a spur gear secured to said second shaft;
(v) said idler gear engaging said drive gear and said spur gear whereby movement of said gear is imparted to said drive means so that said supporting member is moved along said track;
(w) means reacting between said mounting means, said track, and said support member for holding said drive means in uniform contact with said reaction means whereby said support member will be smoothly and uniformly driven along said track.

23. A machine for movably supporting a tool apparatus comprising:
(a) a track assembly adapted to be mounted adjacent workpiece, said track assembly including:
(1) a plurality of elongated flexible laminations positioned in a face to face relationship to form a flexible track which can be shaped to conform to the shape of a workpiece, said laminations each having a series of elongated openings formed therein,
(2) a fastener means attached to said track assembly and passing through the elongated openings in said laminations; whereby, tightening of said fastener means will clamp said laminations in a rigid position and loosening thereof will permit relative movement between said laminations and bending thereof so as to form a track of a desired shape, and
(3) reaction means mounted on said track,
(b) carriage means movably mounted on said track and adapted to support a tool apparatus in a position of close proximity to the workpiece, and
(c) drive means mounted on said carriage means and positioned in driving engagement with said reaction means mounted on said track to drive said carriage means on said track.

(References on following page)

References Cited by the Examiner

UNITED STATES PATENTS

| | | | |
|---|---|---|---|
| 718,733 | 1/1903 | Shea | 267—53 |
| 1,881,328 | 10/1932 | Read | 272—4 |
| 2,246,502 | 6/1941 | Bramsen et al. | 105—153 |
| 2,642,958 | 6/1953 | Lennon | 105—153 |
| 2,718,852 | 9/1955 | Cacciatore | 105—153 |
| 2,972,386 | 2/1961 | Tanke | 29—526 |
| 3,074,354 | 1/1963 | Wakkila | 105—153 |
| 3,102,722 | 9/1963 | Hamontre | 267—47 |
| 3,135,935 | 6/1964 | Englebrecht | 29—526 |

WHITMORE A. WILTZ, *Primary Examiner.*

M. L. FAIGUS, *Assistant Examiner.*